(12) United States Patent
Chisu et al.

(10) Patent No.: US 11,595,462 B2
(45) Date of Patent: Feb. 28, 2023

(54) IN-CALL FEEDBACK TO FAR END DEVICE OF NEAR END DEVICE CONSTRAINTS

(71) Applicant: Motorola Mobility LLC, Chicago, IL (US)

(72) Inventors: Daniel C. Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/565,463

(22) Filed: Sep. 9, 2019

(65) Prior Publication Data

US 2021/0075842 A1    Mar. 11, 2021

(51) Int. Cl.
*H04L 65/80* (2022.01)
*H04L 65/1069* (2022.01)

(52) U.S. Cl.
CPC .......... *H04L 65/80* (2013.01); *H04L 65/1069* (2013.01)

(58) Field of Classification Search
CPC ............................ H04L 65/80; H04L 65/1069
USPC ....................................................... 370/252
See application file for complete search history.

(56) References Cited

U.S. PATENT DOCUMENTS

| | | | |
|---|---|---|---|
| 5,517,561 A | 5/1996 | Redden | |
| 7,874,983 B2 | 1/2011 | Zancho et al. | |
| 8,185,388 B2 | 5/2012 | Gao | |
| 9,666,180 B2 * | 5/2017 | Paquier | G10L 21/0216 |
| 10,228,899 B2 | 3/2019 | Chisu et al. | |
| 2006/0121951 A1 | 6/2006 | Perdomo et al. | |
| 2007/0140306 A1 | 6/2007 | Klein | |
| 2009/0170530 A1 | 7/2009 | Kadavallur et al. | |
| 2010/0151915 A1 | 6/2010 | Huisken | |
| 2012/0274850 A1 | 11/2012 | Hawkins et al. | |
| 2013/0156407 A1 | 6/2013 | Seok et al. | |
| 2014/0375545 A1 | 12/2014 | Ackerman et al. | |
| 2015/0332564 A1 | 11/2015 | Weinberg et al. | |
| 2016/0030841 A1 | 2/2016 | Perlman et al. | |
| 2016/0062730 A1 | 3/2016 | Kwon et al. | |

(Continued)

FOREIGN PATENT DOCUMENTS

WO    WO-2019132174 A1 *    7/2019    ............... B60N 2/00

OTHER PUBLICATIONS

"Non-Final Office Action", U.S. Appl. No. 16/219,664, dated Nov. 15, 2019, 26 pages.

(Continued)

*Primary Examiner* — Intekhaab A Siddiquee
(74) *Attorney, Agent, or Firm* — FIG. 1 Patents (57) ABSTRACT

A near end device is in a call (voice or video) over a communication link with a far end device. The near end device monitors constraints of the near end device, such as environmental noise at the near end device, latency between sequential data packets, signal strength or quality over the communication link, and energy level. The near end device detects when the near end device is having or is soon to have communication difficulty with the call due to one or more of the constraints. In response to detecting that the near end device is having or is soon to have communication difficulty with the call, the near end device communicates one or both of audible feedback and visual feedback to the far end device, notifying the far end device that the near end device is having or is soon to have communication difficulty with the call.

20 Claims, 5 Drawing Sheets

(56) References Cited

U.S. PATENT DOCUMENTS

| | | | |
|---|---|---|---|
| 2016/0246899 A1 | 8/2016 | Hirschtick et al. | |
| 2016/0286575 A1 | 9/2016 | Weingertner et al. | |
| 2016/0292989 A1* | 10/2016 | Belk | H04N 21/4436 |
| 2017/0201613 A1 | 7/2017 | Engelke et al. | |
| 2017/0237784 A1 | 8/2017 | Maistri et al. | |
| 2017/0264735 A1* | 9/2017 | Terra Rios | H04M 3/533 |
| 2018/0061424 A1 | 3/2018 | Lachapelle et al. | |
| 2018/0211668 A1 | 7/2018 | Willett et al. | |
| 2018/0218727 A1* | 8/2018 | Cutler | H04L 65/602 |
| 2018/0373488 A1 | 12/2018 | Chisu et al. | |
| 2019/0020756 A1* | 1/2019 | Karakkad Kesavan Namboodiri | H04M 3/2227 |
| 2019/0121605 A1 | 4/2019 | Chisu et al. | |

OTHER PUBLICATIONS

"Notice of Allowance", U.S. Appl. No. 15/629,160, dated Jan. 10, 2019, 14 pages.

"Non-Final Office Action", U.S. Appl. No. 15/629,160, dated Oct. 5, 2018, 22 pages.

"Final Office Action", U.S. Appl. No. 16/219,664, dated Mar. 2, 2020, 28 pages.

\* cited by examiner

IN-CALL FEEDBACK TO FAR END DEVICE OF NEAR END DEVICE CONSTRAINTS

BACKGROUND

Noon Devices used in voice or video calls can encounter various situations in which the audio of the call is not played out so that a user of the device can hear the audio. For example, in a loud or noisy environment the user may have difficulty hearing the audio. By way of another example, due to network congestion or poor signal quality data packets including audio data may be dropped. The speaking party at the other end of the call is not aware when these situations occur, leaving the user to simply hang up the call, endure the inability to hear the audio, or ask the speaking party to repeat part of what was said. These are frustrating experiences for the user, resulting in user frustration and dissatisfaction with their devices.

BRIEF DESCRIPTION OF THE DRAWINGS

Embodiments of in-call feedback to far end device of near end device constraints are described with reference to the following drawings. The same numbers are used throughout the drawings to reference like features and components.

DETAILED DESCRIPTION

In-call feedback to far end device of near end device constraints is discussed herein. Generally, a computing device referred to as a near end device is in a call (e.g., a voice or a video call) over a communication link with another device referred to as a far end device. The near end device monitors constraints of the near end device, such as one or more of the environmental noise at the near end device, a latency between sequential data packets, signal strength or quality over the communication link, and energy level. The near end device detects when the near end device is having or is soon to have communication difficulty with the call as a result of one or more of the constraints. For example, the near end device detects that the near end device is having or is soon to have communication difficulty with the call if the environmental noise is high, or if the signal strength or quality over the communication link is low. By way of another example, the near end device detects that the near end device is having or is soon to have communication difficulty with the call if the battery charge is low and the near end device is expected to run out of power soon. In response to detecting that the near end device is having or is soon to have communication difficulty with the call, the near end device communicates one or both of audible feedback and visual feedback to the far end device. This feedback notifies the far end device and the user of the far end device that the near end device is having or is soon to have communication difficulty with the call. This feedback can be one or both of audibly played back and visually displayed at the far end device, as well as optionally at the near end device.

The feedback to the far end device optionally includes a transcription of audio that is determined to likely have not been heard by the user at the near end device. This notifies the far end device of what call audio was likely not heard by the user at the near end device.

The various embodiments described herein improve upon the state of the art by monitoring device constraints of a near end device during a call and automatically providing audible or visual feedback to the far end device when the near end device is having or is soon to have communication difficulty with the call. This notifies the far end device and user of the far end device of the communication difficulty, and allows the user of the far end device to emphasize or repeat some speech deemed lost during the call, prioritize the call to cover the most important aspects of the conversation, and so forth. Furthermore, if the feedback includes a transcription of call audio that was likely not heard by the user at the near end device, this allows the user at the far end device to know which part of the call audio to repeat or communicate to the near end device in some other manner (e.g., by text message).

The techniques discussed herein thus improve the user experience with voice and video calls because the call participants are automatically notified during the call when one user is experiencing or is soon to experience communication difficulty, even if that user is not aware that he is experiencing or soon to experience communication difficulty. This allows the users to emphasize or repeat speech deemed lost during the call, prioritize the call to cover the most important aspects of the conversation, and so forth, thereby increasing the possibility of having the desired information communicated during the call despite the communication difficulty.

Figure 1:
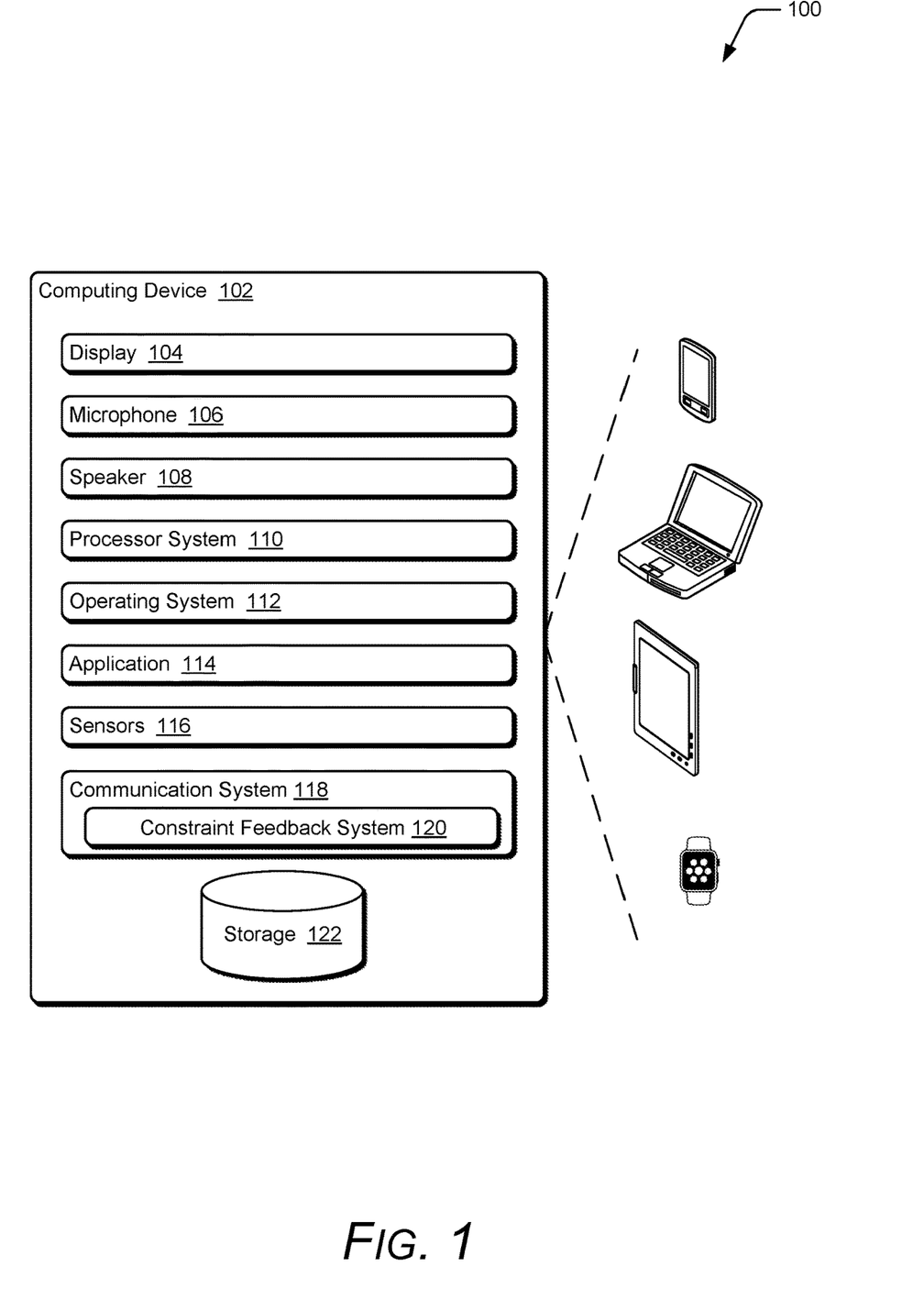
FIG. 1 illustrates an example computing device implementing the techniques discussed herein.

FIG. 1 illustrates an example computing device 102 implementing the techniques discussed herein. The computing device 102 can be many different types of computing or electronic devices. For example, the computing device 102 can be a smartphone or other wireless phone, a notebook computer (e.g., netbook or ultrabook), a laptop computer, a wearable device (e.g., a smartwatch, augmented reality headsets or glasses, virtual reality headsets or glasses), a tablet or phablet computer, an Internet of Things (IoT) device, an automotive computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications 114 running on the computing device 102 and operates as an interface between applications 114 and hardware components of the computing device 102.

The computing device 102 also includes one or more sensors 116. A variety of different types of sensors 116 can be included in the computing device 102, such as a thermal sensor, a proximity sensor, an image capture device (e.g., a camera), an active IR sensor, a passive IR sensor, a fingerprint sensor, and so forth.

The computing device 102 also includes a communication system 118. The communication system 118 establishes a communication link (also referred to as a communication channel) with one or more other devices over which a call (e.g., voice or video) occurs. The computing device 102 is also referred to as a near end device and the one or more other devices with which the computing device 102 establishes a communication link are each also referred to as a far end device or a remote device. Each far end device can be a computing device analogous to computing device 102 or can be a traditional non-computing based device (e.g., a traditional landline phone). The communication link can be established in accordance with any of a variety of different standards or protocols, and the establishment of the communication link can be initiated by the computing device 102 or a far end device.

The communication link can be established over any of a variety of networks, such as a local area network (LAN), a wide area network (WAN), a metropolitan area network (MAN), a telephone network (e.g., a public switched telephone network (PSTN), a cellular network, a Wi-Fi network, an intranet, the Internet, an optical fiber (or fiber optic)-based network, an enterprise network, a carrier network, a service provider network), or a combination thereof.

The communication link can be established using any of a variety of different wired or wireless technologies, networks, connections, and so forth. Furthermore, the communication link use any of a variety of different public or proprietary standards, protocols, and so forth. For example, the communication link can be established over a fourth generation (4G) cellular network, a fifth generation (5G) cellular network, the Internet, a Wi-Fi network, combinations thereof, and so forth. By way of another example, the communication link can be established in accordance with the voice over long-term evolution (VoLTE) standard, the Voice over New Radio (VoNR) standard, voice over Internet Protocol (VoW) standards, Video Telephony (VT) standards, Push to Talk standards, and so forth. It should be noted that these networks can include carrier-provided networks (e.g., VoLTE, VT, Push to Talk, VoNR) as well as non-carrier-provided networks or service provider networks (e.g., third party video conference or voice call applications communicating via the Internet or other data network).

The communication system 118 also includes a constraint feedback system 120. The constraint feedback system 120 monitors constraints of the computing device 102, such as one or more of the environmental noise at the near end device, a latency between sequential data packets, one or both of signal strength and quality over the communication link, and energy level. The computing device 102 detects when the computing device 102 is having or is soon to have communication difficulty with the established call as a result of one or more of the constraints. In response to detecting that the computing device 102 is having or is soon to have communication difficulty with the call, the computing device 102 communicates one or both of audible feedback and visual feedback to the far end device. In situations in which the computing device 102 is in a call with multiple far end devices, the computing device 102 communicates one or both of audible feedback and visual feedback to each of the far end devices.

The communication system 118 can be implemented in a variety of different manners. For example, the communication system 118 can be implemented as multiple instructions stored on computer-readable storage media and that can be executed by the processor system 110. Additionally or alternatively, the communication system 118 can be implemented at least in part in hardware (e.g., as an application-specific integrated circuit (ASIC), a field-programmable gate array (FPGA), and so forth). The communication system 118 is implemented using various hardware, firmware, or software components, such as a transceiver, to support communication over one or more networks.

The computing device 102 also includes a storage device 122. The storage device 122 can be implemented using any of a variety of storage technologies, such as magnetic disk, optical disc, Flash or other solid state memory, and so forth. The storage device 122 can store various program instructions and data for the operating system 112, application 114, or communication system 118.

It should be noted that although discussed herein with reference to a near end device and a far end device, each far end device can also perform the functionality discussed herein (essentially operating, from that far end device's point of view, as a near end device). For example, each far end device can monitor constraints of that far end device, detect when that far end device is having or is soon to have communication difficulty with the established call as a result of one or more of the constraints, and in response to that detection communicates one or both of audible feedback and visual feedback to the computing device 102. Received audible feedback is played back at the computing device 102 (e.g., via the speaker 108) and received visual feedback is displayed at the computing device 102 (e.g., via the display 104).

Figure 2:
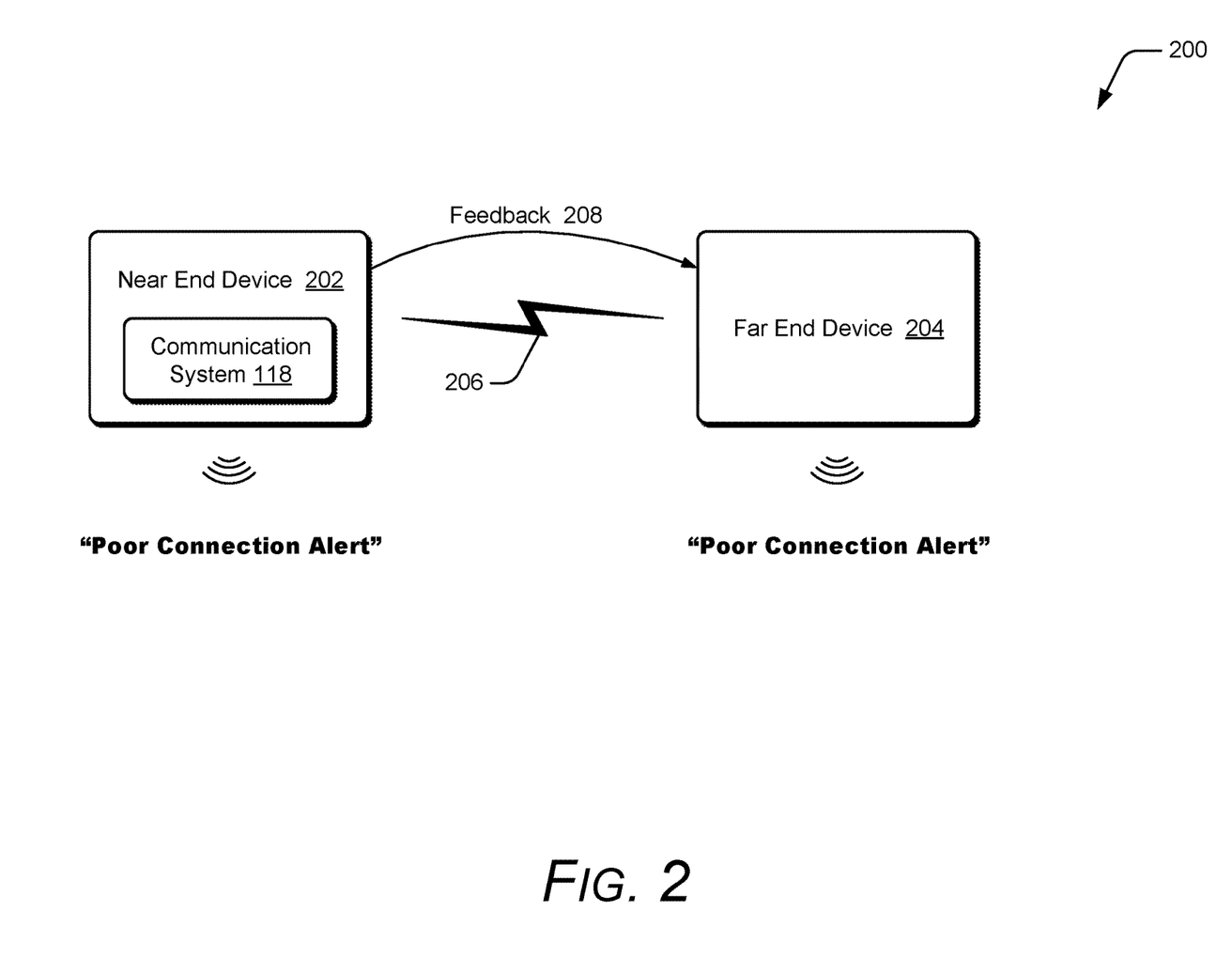
FIG. 2 illustrates an example environment in which the in-call feedback to far end device of near end device constraints can be implemented.

FIG. 2 illustrates an example environment 200 in which the in-call feedback to far end device of near end device constraints can be implemented. The environment 200 includes a near end device 202 and a far end device 204. The near end device 202 is a computing device 102 of FIG. 1 and includes the communication system 118. The far end device 204 can be a computing device analogous to the computing device 102 or another type of device (e.g., a traditional landline phone). The near end device 202 and the far end device 204 establish a call between each other over the communication link 206. The call can be a voice call, a video call, combination thereof, and so forth.

The communication system 118 manages the call for the near end device 202. The communication system 118 monitors constraints of the near end device 202 and detects when the near end device 202 is having or is soon to have communication difficulty with the established call as a result of one or more of the constraints. In response to detecting that the near end device 202 is having or is soon to have communication difficulty with the call, the communication system 118 communicates feedback 208 to the far end device 204 indicating that the near end device 202 is having or is soon to have communication difficulty with the call.

In the illustrated example, the feedback 208 is audible feedback (e.g., the phrase "Poor Connection Alert"), which is injected into the call. For example, the communication system 118 plays the audible feedback while the call is occurring. Thus, the audible feedback is played back at the far end device 204 as well as the near end device 202. Although illustrated as audible feedback, visual feedback can also be communicated to the far end device 204 as discussed in more detail below.

Figure 3:
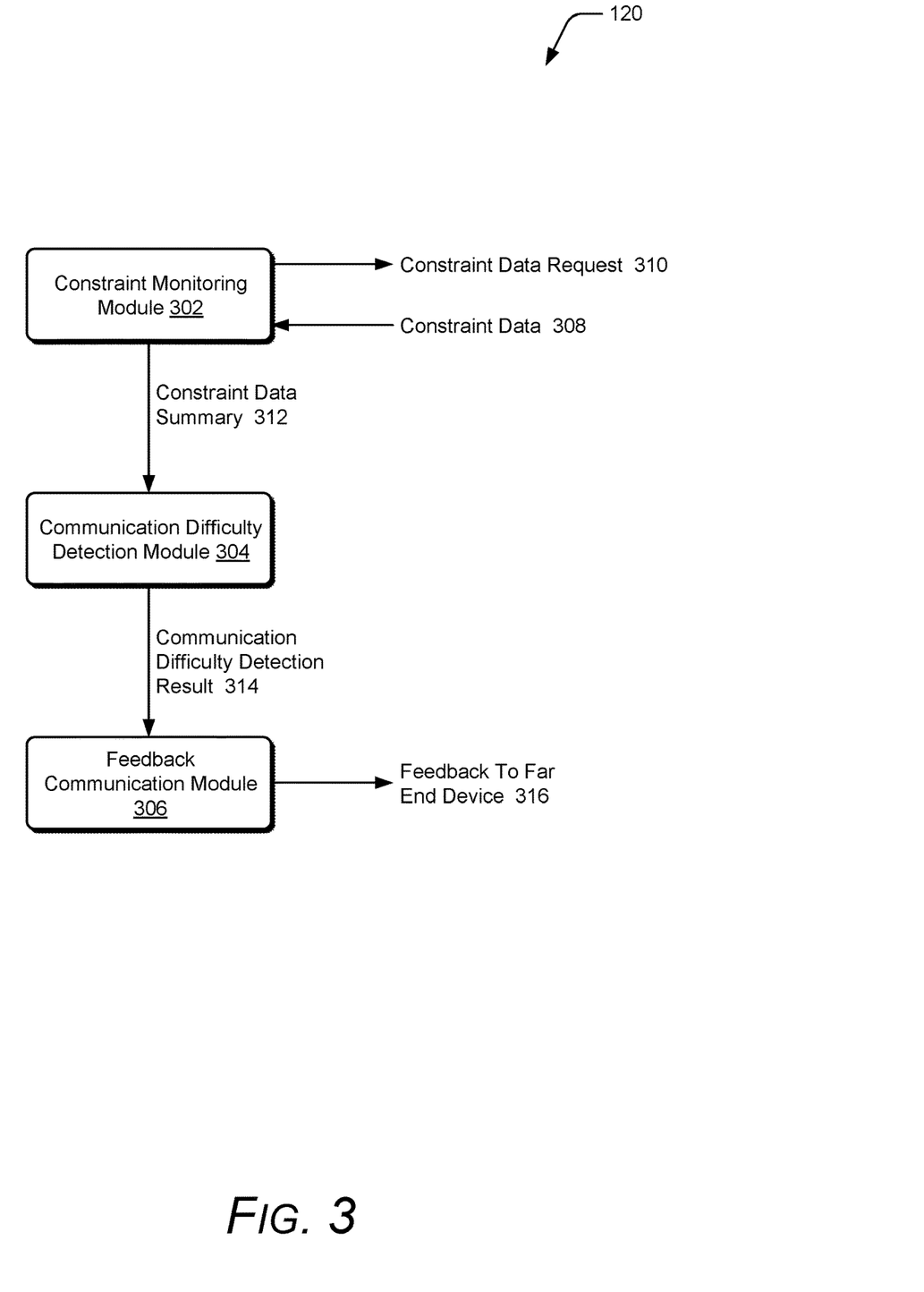
FIG. 3 illustrates an example architecture of the constraint feedback system.

FIG. 3 illustrates an example architecture of the constraint feedback system 120. The constraint feedback system 120 includes a constraint monitoring module 302, a communication difficulty detection module 304, and a feedback communication module 306.

The constraint monitoring module 302 obtains constraint data 308 from one or more other modules, programs, or components of the computing device 102. In one or more embodiments, the constraint monitoring module 302 obtains constraint data 308 from one or more sensors in the computing device 102, such as a microphone or circuitry that captures data regarding charge or energy in a battery of the computing device. Additionally or alternatively, the constraint monitoring module 302 obtains constraint data 308 from other sources, such as a transceiver of the communication system 118, which will know when data packets are received over the communication link, signal conditions of the communication link such as one or both of radio frequency (RF) strength and quality of the communication link, and so forth.

The constraint monitoring module 302 can obtain the constraint data 308 in a variety of different manners. In one or more embodiments, the constraint monitoring module 302 issues one or more requests 310 for constraint data to various other modules, programs, or components of the computing device 102. In response to such requests 310, the modules, programs, or components return the requested constraint data. Additionally or alternatively the constraint monitoring module 302 subscribes to receive messages or events posted by one or more other modules, programs, or components of the computing device 102. These messages or events can include constraint data, and the constraint monitoring module 302 monitors these messages or events to identify the constraint data.

Constraint data refers to data that describes constraints of the computing device 102. The constraints of the computing device 102 refer to limitations or restrictions of the computing device 102. These constraints can cause communication difficulty for the computing device 102. Communication difficulty for the computing device 102 refers to situations in which the user of the computing device 102 will have or is soon to have difficulty hearing audio of the call. Such situations can arise for a variety of different reasons, such as the computing device 102 being in a loud or noisy environment, data packet latency over the communication link, poor signal conditions over the communication link, low energy availability in the computing device 102 (e.g., low battery charge), other resource usage issues (e.g., available memory too low, computing device 102 is running too hot), and so forth as discussed in more detail below.

In one or more embodiments, the constraint monitoring module 302 obtains as constraint data 308 a current noise level (e.g., in decibels) from the microphone 106. The constraint monitoring module 302 determines the environmental noise for the computing device 102, which refers to any noise that is detectable by the microphone 106 other than speech that is communicated by a user of the computing device 102.

The constraint monitoring module 302 can distinguish the user's speech from other noise using a variety of techniques. For example, the constraint monitoring module 302 can be trained to recognize sound waves generated by the user's vocal cords over the course of multiple voice calls and identify patterns that can be distinguished from sounds generated from different sources. Additionally or alternatively, the constraint monitoring module 302 can be user-independent and configured to differentiate human speech from other sound sources using Hidden Markov Models, neural networks, and the like. The constraint monitoring module 302 determines a level of the environmental noise and quantifies this level in terms of decibels.

The constraint monitoring module 302 can provide an indication of the environmental noise to the communication difficulty detection module 304 as at least part of constraint data summary 312. The indication of the environmental noise can be, for example, a noise level at a particular point in time, an average noise level over a particular time range (e.g., the previous 5 or 10 seconds), and so forth.

In one or more embodiments, the constraint monitoring module 302 determines data packet latency over the communication link. This data packet latency refers to latency between sequential data packets in a series of data packets including call data, e.g., two sequential data packets in the series of data packets. For example, for calls that transmit media data (e.g., audio, video, and the like) using data packets, such as an IP Multimedia Subsystem (IMS) call that transmits media data using Real-time Transport Protocol (RTP) packets, scenarios arise where RTP packets are dropped before call audio can be extracted and played back to a user. Although described with respect to an IMS call, the techniques described herein can be implemented by any type of module or system responsible for the handling of RTP packets. Due to network traffic or errors, data packets are often lost during transfer between two endpoints. One approach to anticipate when a data packet might be lost is to monitor the time delay, also described in terms of latency or jitter, between sequentially received data packets. A greater latency between sequential data packets indicates that the network is overloaded and is likely to drop a subsequent data packet. Alternatively or additionally, a greater latency between sequential data packets may indicate that the device receiving data packets is dropping data packets with high jitter after reception.

Upon receiving data packets, the communication system 118 decodes the data packets and extracts audio data from the data packets. The IMS monitors latencies between received data packets and allows the communication system to decode data packets only when the latencies between received data packets do not amount to excessive delay. However, when latencies between received data packets amount to excessive delay, the IMS drops the packets before audio data can be extracted from the dropped packets. The constraint feedback system 120 has access to, as constraint data 308, an incoming RTP stream received at the IMS of the computing device implementing the communication system and monitors latencies between received data packets to predict when a data packet might be dropped. This enables the constraint monitoring module 302 to keep track of inter-packet delays, e.g., latencies between sequential data packets.

The constraint monitoring module 302 can provide an indication of the inter-packet delays to the communication difficulty detection module 304 as at least part of constraint data summary 312. The indication of the inter-packet delays can be, for example, the inter-packet delay at a particular point in time, an average inter-packet delay over a particular time range (e.g., the previous 5 or 10 seconds) or number of packets (e.g., 20 packets), and so forth.

In one or more embodiments, the constraint monitoring module 302 obtains as constraint data 308 information describing signal conditions over the communication link. The signal conditions indicate a quality of the communication link and can be described in a variety of different manners. For example, the signal conditions can be one or both of a radio frequency (RF) signal strength (such as a received signal strength indicator (RSSI) value) and an RF signal quality (such as a received RF signal deviates from an "ideal" modulated signal). By way of another example, the signal conditions can be a packet error rate for data packets including call data.

The constraint monitoring module 302 can provide an indication of the signal conditions to the communication difficulty detection module 304 as at least part of constraint data summary 312. The indication of the signal conditions can be, for example, the RF signal strength, signal quality, or packet error rate at a particular point in time, an average RF signal strength, signal quality, or packet error rate over a particular time range (e.g., the previous 5 or 10 seconds), and so forth.

In one or more embodiments, the constraint monitoring module 302 obtains as constraint data 308 information describing energy availability in the computing device 102. Energy availability refers to how much energy is available for the computing device 102 to use, such as how much energy remains in a battery of the computing device 102. The energy availability can be described in a variety of different manners. For example, the energy availability can be an amount of charge or energy that remains in the battery (e.g., as indicated by circuitry of the battery). By way of another example, the energy availability can be a charge level identifying a percentage of the battery's full capacity remains (e.g., as indicated by circuitry of the battery). By way of another example, the energy availability can be an estimated remaining call duration (an amount of time that the energy in the battery will power the computing device 102 so that the call can continue, after which the call is dropped because the battery charge battery is depleted). The constraint monitoring module 302 can readily estimate a remaining call duration based on an amount of charge or energy that remains in the battery and an energy consumption rate for the computing device 102 during a call. This energy consumption rate can be determined in various manners, such as provided by a manufacturer of the computing device 102, automatically determined by the computing device 102 monitoring battery charge and the power usage during a call, and so forth.

The constraint monitoring module 302 can provide an indication of the energy availability to the communication difficulty detection module 304 as at least part of constraint data summary 312. The indication of the energy availability can be, for example, the amount of charge or energy that remains in the battery, the charge level of the battery, the estimated remaining call duration, and so forth.

The communication difficulty detection module 304 receives and uses the constraint data summary 312 to determine whether the computing device 102 is having or is soon to have communication difficulty with the call. The communication difficulty detection module 304 can determine whether the computing device 102 is having or is soon to have communication difficulty with the call based on any of the constraint data summary 312, including an indication of the environmental noise, an indication of the inter-packet delays, an indication of the signal conditions over the communication link, an indication of the energy availability, combinations thereof, and so forth.

In one or more embodiments, the communication difficulty detection module 304 determines whether the computing device 102 is having or is soon to have communication difficulty with the call based on an indication of the environmental noise by comparing the indication of environmental noise to a threshold level of environmental noise. The communication difficulty detection module 304 determines that the computing device 102 is having or is soon to have communication difficulty in response to the indication of environmental noise satisfying (e.g., meeting or exceeding) the threshold level of environmental noise, and that the computing device 102 is not having or is not soon to have communication difficulty in response to the indication of environmental noise not satisfying (e.g., not meeting or not exceeding) the threshold level of environmental noise.

The communication difficulty detection module 304 is made aware of a threshold level of environmental noise that, when satisfied, indicates that the environmental noise is likely loud enough to inhibit a user's ability to clearly hear call audio. In one or more embodiments, the threshold level of environmental noise is specified by a manufacturer of the computing device 102. Alternatively or additionally, the threshold level of environmental noise is specified by the user of the computing device 102. In one or more embodiments, the communication difficulty detection module 304 may periodically prompt the user for feedback regarding whether the user is able to hear the call audio. In this manner, the communication difficulty detection module 304 can record user feedback and adjust the threshold level of environmental noise to account for different user preferences.

The threshold level of environmental noise can also be specified as a function of a level of call audio received at the computing device 102. For example, the threshold level of environmental noise can be satisfied when a level of the received call audio is equivalent to a level of the environmental noise. Alternatively or additionally, the threshold level of environmental noise can be satisfied when the level of environmental noise is within a specified decibel range from the level of received call audio. Thus, the constraint monitoring module 302 is configured to constantly monitor environmental noise and determine when the environmental noise reaches a level that makes it unlikely for a user to hear received call audio.

In one or more embodiments, after determining that the environmental noise satisfies an environmental noise threshold, the communication difficulty detection module 304 begins transcribing received audio data from the call to text. The transcribed audio data can then be provided as feedback to the far end device, notifying the far end device of what audio was likely not heard by the user at the near end device. Additionally or alternatively, the transcribed audio data is displayed at the computing device 102.

Although an environmental noise threshold is discussed, it should be noted that the communication difficulty detection module 304 can additionally or alternatively determine whether the computing device 102 is having or is soon to have communication difficulty with the call based on an indication of the environmental noise in other manners. For example, various different rules or criteria can be applied to the indication of the environmental noise in the constraint data summary 312 to determine whether the computing device 102 is having or is soon to have communication difficulty with the call. By way of another example, a machine learning system can be trained on the indication of the environmental noise in the constraint data summary 312 to determine whether the computing device 102 is having or is soon to have communication difficulty with the call.

The communication difficulty detection module 304 provides an indication that the environmental noise reached a level that makes it unlikely for a user to hear received call audio as at least part of communication difficulty detection result 314. The communication difficulty detection module 304 also optionally includes the transcribed audio data as at least part of the communication difficulty detection result 314.

In one or more embodiments, the communication difficulty detection module 304 determines whether the computing device 102 is having or is soon to have communication difficulty with the call based on an indication of the inter-packet delays by comparing the indication of the inter-packet delays to a threshold level of data packet latency. This threshold level of data packet latency is quantified in terms of time. The communication difficulty detection module 304 determines that the computing device 102 is having or is soon to have communication difficulty in response to the indication of inter-packet delays satisfying (e.g., meeting or exceeding) the threshold level of data packet latency, and that the computing device 102 is not having or is not soon to have communication difficulty in response to the indication of inter-packet delays not satisfying (e.g., not meeting or not exceeding) the threshold level of data packet latency.

The communication difficulty detection module 304 is made aware of a threshold level of data packet latency that, when satisfied, indicates that a data packet will be dropped rather than decoded for playback of contained audio data. In one or more embodiments, the threshold level of data packet latency is specified by a manufacturer of the computing device 102. Alternatively or additionally, the threshold level of data packet latency is specified by the user of the computing device 102. Alternatively or additionally, the threshold level of data packet latency is specified by a service provider facilitating transfer of data packets between the computing device 102 and different devices participating in the audio call. In some examples, the threshold level of data packet latency is representative of a latency level at which data packets are dropped by the IMS to avoid large end-to-end audio delays.

After determining that the monitored latency between received data packets satisfies the threshold level of data packet latency, the communication difficulty detection module 304 retrieves data packets from the IMS before they are de-queued and discarded. After retrieving the data packets, the communication difficulty detection module 304 extracts audio data for the call from the data packets and transcribes speech from the audio data. The transcribed audio data can then be provided as feedback to the far end device, notifying the far end device of what audio was not heard by the user at the near end device due to the dropped data packets. Additionally or alternatively, the transcribed audio data can be displayed at the computing device 102.

The communication difficulty detection module 304 provides an indication that the latency between received data packets makes it unlikely for a user to hear received call audio due to dropped data packets as at least part of communication difficulty detection result 314. The communication difficulty detection module 304 also optionally includes the transcribed audio data as at least part of the communication difficulty detection result 314.

Although a threshold level of data packet latency is discussed, it should be noted that the communication difficulty detection module 304 can additionally or alternatively determine whether the computing device 102 is having or is soon to have communication difficulty with the call based on an indication of the inter-packet delays in other manners. For example, various different rules or criteria can be applied to the indication of the inter-packet delays in the constraint data summary 312 to determine whether the computing device 102 is having or is soon to have communication difficulty with the call. By way of another example, a machine learning system can be trained on the indication of the inter-packet delays in the constraint data summary 312 to determine whether the computing device 102 is having or is soon to have communication difficulty with the call.

In one or more embodiments, the communication difficulty detection module 304 determines whether the computing device 102 is having or is soon to have communication difficulty with the call based on an indication of the signal conditions over the communication link by comparing the indication of the signal conditions to a threshold level of signal conditions. This threshold level of signal conditions can be quantified in terms of signal strength or quality in situations where the indication of signal conditions is RF signal strength or quality, or in terms of a real number in situations where the indication of signal conditions is a packet error rate. The communication difficulty detection module 304 determines that the computing device 102 is having or is soon to have communication difficulty in response to the indication of signal conditions satisfying (e.g., meeting or falling below) the threshold level of signal conditions, and that the computing device 102 is not having or is not soon to have communication difficulty in response to the indication of signal conditions not satisfying (e.g., not meeting or not falling below) the threshold level of signal conditions.

The communication difficulty detection module 304 is made aware of a threshold level of signal conditions that, when satisfied, indicates that it unlikely for a user to hear received call audio. In one or more embodiments, the threshold level of signal conditions is specified by a manufacturer of the computing device 102. Alternatively or additionally, the threshold level of signal conditions is specified by the user of the computing device 102. Alternatively or additionally, the threshold level of data packet latency is specified by a service provider facilitating transfer of data packets between the computing device 102 and different devices participating in the call.

In one or more embodiments, the communication difficulty detection module 304 uses the indication of signal conditions to determine a call quality for the call based on multiple threshold levels. This call quality can be two or more different categories, such as: A) good, average, or bad; B) high, medium, or low; and so forth. For example, the communication difficulty detection module 304 determines that the call quality is good in response to the indication of signal conditions satisfying (e.g., meeting or exceeding) an upper threshold level of signal conditions, that the call quality is average in response to the indication of signal conditions not satisfying (e.g., not meeting or not exceeding) an upper threshold level of signal conditions but satisfying (e.g., meeting or exceeding) a lower threshold level of signal conditions, and that the call quality is bad in response to the indication of signal conditions not satisfying (e.g., not meeting or not exceeding) the lower threshold level of signal conditions.

Although a threshold level of signal conditions is discussed, it should be noted that the communication difficulty detection module 304 can additionally or alternatively determine whether the computing device 102 is having or is soon to have communication difficulty with the call based on an indication of the signal conditions over the communication link in other manners. For example, various different rules or criteria can be applied to the indication of the signal conditions over the communication link in the constraint data summary 312 to determine whether the computing device 102 is having or is soon to have communication difficulty with the call. By way of another example, a machine learning system can be trained on the indication of the signal conditions over the communication link in the constraint data summary 312 to determine whether the computing device 102 is having or is soon to have communication difficulty with the call.

The communication difficulty detection module 304 provides an indication that the signal conditions are poor enough that the signal conditions reached a level that makes it unlikely for a user to hear received call audio as at least part of communication difficulty detection result 314. The communication difficulty detection module 304 also optionally includes the signal conditions (e.g., the RF signal strength or quality, the packet error rate, or the determined call quality) as at least part of the communication difficulty detection result 314.

In one or more embodiments, the communication difficulty detection module 304 determines whether the computing device 102 is having or is soon to have communication difficulty with the call based on an indication of the energy availability by comparing the indication of the energy availability to a threshold level of energy availability. This threshold level of energy availability can be quantified in terms of energy in situations where the indication of the energy availability is the amount of charge or energy that remains in the battery, in terms of percentages where the indication of the energy availability is the charge level of the battery, or in terms of time where the indication of the energy availability is the remaining call duration. The communication difficulty detection module 304 determines that the computing device 102 is having or is soon to have communication difficulty in response to the indication of energy availability satisfying (e.g., meeting or falling below) the threshold level of energy availability, and that the computing device 102 is not having or is not soon to have communication difficulty in response to the indication of energy availability not satisfying (e.g., not meeting or not falling below) the threshold level of energy availability.

The communication difficulty detection module 304 is made aware of a threshold level of energy availability that, when satisfied, indicates that it is unlikely for a user to hear received call audio. In one or more embodiments, the threshold level of energy availability is specified by a manufacturer of the computing device 102. Alternatively or additionally, the threshold level of energy availability is specified by the user of the computing device 102.

In one or more embodiments, the communication difficulty detection module 304 uses the indication of energy availability to determine an energy grade for the call based on multiple threshold levels. This energy grade can be two or more different categories, such as: A) good, average, or bad; B) high, medium, or low; and so forth. For example, the communication difficulty detection module 304 determines that the energy grade is good in response to the indication of energy availability satisfying (e.g., meeting or exceeding) an upper threshold level of energy availability, that the energy grade is average in response to the indication of energy availability not satisfying (e.g., not meeting or not exceeding) an upper threshold level of energy availability but satisfying (e.g., meeting or exceeding) a lower threshold level of energy availability, and that the energy grade is bad in response to the indication of energy availability not satisfying (e.g., not meeting or not exceeding) the lower threshold level of energy availability.

Although a threshold level of energy availability is discussed, it should be noted that the communication difficulty detection module 304 can additionally or alternatively determine whether the computing device 102 is having or is soon to have communication difficulty with the call based on an indication of the energy availability in other manners.

For example, various different rules or criteria can be applied to the indication of the energy availability in the constraint data summary 312 to determine whether the computing device 102 is having or is soon to have communication difficulty with the call. By way of another example, a machine learning system can be trained on the indication of the energy availability in the constraint data summary 312 to determine whether the computing device 102 is having or is soon to have communication difficulty with the call.

The communication difficulty detection module 304 provides, as at least part of communication difficulty detection result 314, an indication that the energy availability became poor enough that makes it likely the user is soon to have communication difficulty with the call (e.g., due to loss of power). The communication difficulty detection module 304 also optionally includes the energy availability (e.g., the amount of charge or energy that remains in the battery, the charge level of the battery, the remaining call duration, or the determined energy grade) as at least part of the communication difficulty detection result 314.

The feedback communication module 306 receives the communication difficulty detection result 314 and communicates feedback 316 to the far end device. The feedback 316 indicates to the far end device that the computing device 102 is having or is soon to have communication difficulty with the call. Additionally or alternatively, the feedback communication module 306 can play back or display the feedback 316 at the near end device as well.

In one or more embodiments, the feedback 316 is audible feedback. The feedback communication module 306 can provide audible feedback in various different manners. In one or more embodiments, the feedback communication module 306 injects audio into the call, playing back a notification (such as "Poor Connection Alert") for all parties on the call to hear. Additionally or alternatively, the feedback communication module 306 can send a command to the far end device to play back an audible alert (e.g., an alarm, tone, or pre-recorded message) indicating that the computing device 102 is having or is soon to have communication difficulty with the call.

Additionally or alternatively, the feedback 316 is visual feedback. The visual feedback can be displayed by the far end device, indicating to the user of the far end device that the computing device 102 is having or is soon to have communication difficulty with the call. The visual feedback can include any of a variety of different data. In one or more embodiments, the feedback communication module 306 can include any data from the communication difficulty detection result 314 in the visual feedback, such as the transcription of any transcribed audio, the signal conditions (e.g., the RF signal strength or quality, the packet error rate, or the determined call quality), the energy availability (e.g., the amount of charge or energy that remains in the battery, the charge level of the battery, the remaining call duration, or the determined energy grade), and so forth.

In one or more embodiments, the feedback 316 is sent to the far end device using the same communication link as was established for the call. Additionally or alternatively, the feedback 316 can be sent using a different communication link, such as IMS-SMS (Short Messaging Service over IP Multimedia Subsystem), RTCP (Real-time Transport Protocol Control Protocol), and so forth.

This monitoring by the constraint monitoring module 302, detection by the communication difficulty detection module 304, and the providing feedback by the feedback communication module 306 can be performed continually or at various regular or irregular intervals. For example, the constraint monitoring module 302 can continually monitor the constraint data 308 and the communication difficulty detection module 304 can perform a new detection at regular or irregular intervals (e.g., every 10 or 20 seconds) or in response to the constraint data summary 312 changing. The communication difficulty detection module 304 sends communication difficulty detection result 314 to the feedback communication module 306 and the feedback communication module 306 communicates the feedback 316 to the far end device only in response to a change in the communication difficulty detection result 314. Additionally or alternatively, the feedback communication module 306 may communicate the feedback 316 to the far end device only in response to a change in the communication difficulty detection result 314 indicating that the computing device 102 is no longer having or is no longer soon to have communication difficulty with the call.

Different feedback 316 can also be sent to the far end device at different times. For example, initial audible and visual feedback 316 can be sent to the far end device, such as playback of a notification (such as "Poor Connection Alert") for all parties on the call to hear and the transcription of any transcribed audio. Subsequently (e.g., 15 seconds later), if the computing device 102 is still having or is soon to have communication difficulty with the call, only visual feedback in the form of the transcription of any transcribed audio is sent. This informs the far end device of what audio was likely not heard by the user at the near end device since the last feed feedback (e.g., during the preceding 15 seconds). The audible feedback need not be sent because there has been no change in whether the computing device 102 is still having or is soon to have communication difficulty with the call.

The communication difficulty detection module 304 thus continues to determine whether the computing device 102 is having or is soon to have communication difficulty with the call. In response to determining that the computing device 102 is no longer having or is no longer soon to have communication difficulty with the call, an indication of this determination is included in communication difficulty detection result 314, causing the feedback communication module 306 to send feedback 316 to the far end device indicating that the computing device 102 is no longer having or is no longer soon to have communication difficulty with the call. This feedback can be one or both of audible feedback and visual feedback, and can optionally be played back or displayed at the computing device 102. For example, the feedback communication module 306 may inject audio into the call, playing back a notification (such as "Good Connection Resumed") for all parties on the call to hear, or send a visual SMS message indicating that the poor connection no longer exists. Furthermore, in response to determining that the computing device 102 is no longer having or is no longer soon to have communication difficulty with the call, the feedback communication module 306 ceases sending feedback 316 to the far end device including transcriptions of any transcribed audio, the signal conditions, the energy availability, and so forth It should be noted that the constraint feedback system 120 operates in real-time, allowing feedback to be provided to the far end device during the call. In one or more embodiments, the communication system 118 uses a dedicated processor for transcribing call audio to expedite the transcription and facilitate real-time operation.

Figure 4:
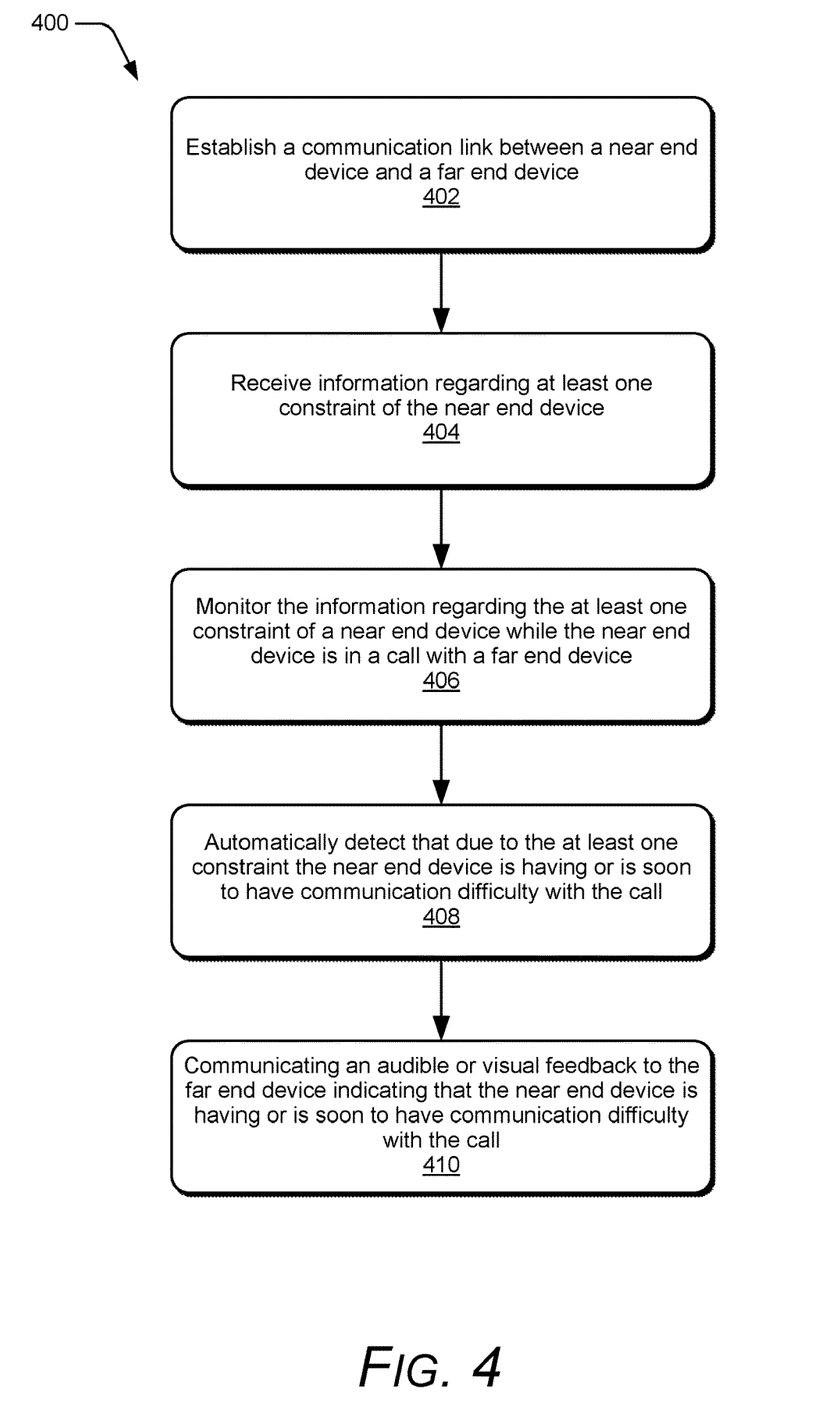
FIG. 4 illustrates an example process for implementing the techniques discussed herein in accordance with one or more embodiments.

FIG. 4 illustrates an example process 400 for implementing the techniques discussed herein in accordance with one or more embodiments. Process 400 is carried out by a constraint feedback system, such as the constraint feedback system 120 of FIG. 1 or FIG. 3, and can be implemented in software, firmware, hardware, or combinations thereof. Process 400 is shown as a set of acts and is not limited to the order shown for performing the operations of the various acts.

In process 400, a communication link is established between a near end device and a far end device (act 402). The communication link can be established over any of a variety of different types of networks, and in accordance with any of a variety of different protocols, standards, and technologies.

Information regarding at least one constraint of the near end device is received (act 404). This information is received from the communication system (e.g., a transceiver of the communication system) or another sensor in the near end device (e.g., a microphone, battery charge circuitry).

The information regarding the at least one constraint is monitored while the near end device is in a call with the far end device over the communication link (act 406). This monitoring includes, for example, one or more of monitoring energy availability at the near end device, monitoring signal conditions over the communication link, monitoring environmental noise at the near end device, and monitoring a latency between sequential data packets in a series of multiple data packets received at the near end device.

The near end device having, or soon to be having, communication difficulty with the call is automatically detected (act 408). This automatic detecting includes, for example, one or more of automatically detecting that the near end device is having or is soon to have communication difficulty with the call in response to the energy availability satisfying an energy availability threshold value, automatically detecting that the near end device is having or is soon to have communication difficulty with the call in response to the signal conditions satisfying a signal conditions threshold value, automatically detecting when a user of the near end device is unlikely to hear the call audio received at the computing device, and automatically detecting comprising automatically detecting the near end device is having or is soon to have communication difficulty in response to determining that the latency between a set of two sequential data packets in the series of multiple data packets satisfies a data packet latency threshold.

Audible or visual feedback is communicated to the far end device indicating that the near end device is having or is soon to have communication difficulty with the call (act 410). This visual feedback optionally includes a transcription of call audio that was likely not heard by the user at the near end device. The audio feedback is optionally played back and the visual feedback is optionally displayed at the near end device.

Figure 5:
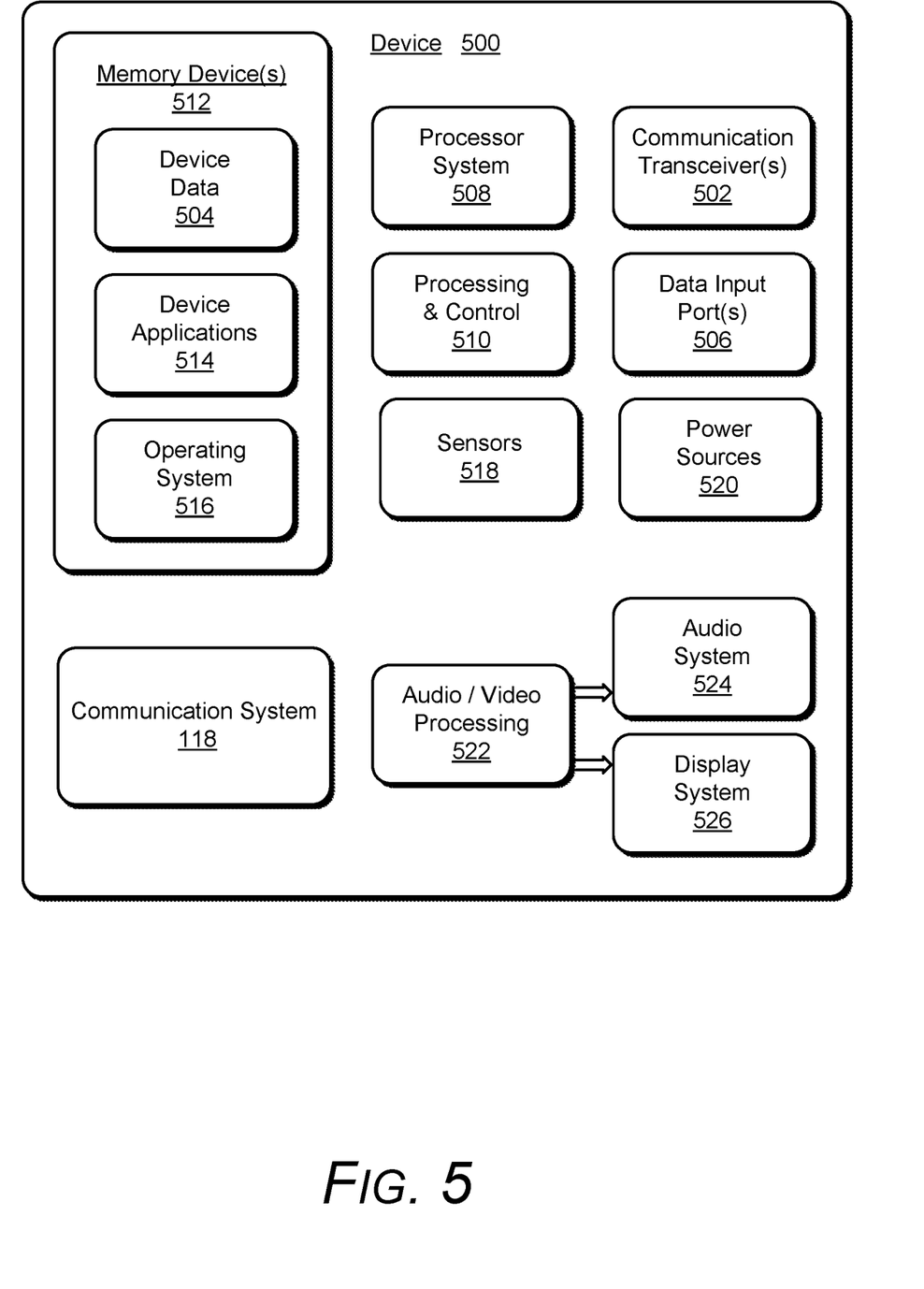
FIG. 5 is an illustration of an example device in accordance with one or more embodiments.

FIG. 5 illustrates various components of an example device 500 in which embodiments of in-call feedback to far end device of near end device constraints can be implemented. The example device 500 can be implemented as any of the devices described with reference to the previous FIG.s, such as any type of client device, mobile phone, tablet, computing, communication, entertainment, gaming, media playback, and/or other type of electronic device.

The device 500 includes communication transceivers 502 that enable wired and/or wireless communication of device data 504 with other devices. The device data 504 can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system 508 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternately or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory devices 512 that enable data storage, such as data storage devices that can be accessed by a computing device, and that provide persistent storage of data and executable instructions (e.g., software applications, programs, functions, and the like). Examples of the computer-readable storage memory devices 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory device 512 provides data storage mechanisms to store the device data 504, other types of information and/or data, and various device applications 514 (e.g., software applications). For example, an operating system 516 can be maintained as software instructions with a memory device and executed by the processing system 508. Additionally, although illustrated separate from the computer-readable storage memory device 512, the communication system 106 can be maintained as one of device applications 514. The device applications may also include a device manager, such as any form of a control application, software application, signal-processing and control module, code that is native to a particular device, a hardware abstraction layer for a particular device, and so on.

Device 500 can include communication system 118, which operates as described herein. The communication system 118 can be implemented in any suitable hardware, software, firmware, or combination thereof.

The device 500 can also include one or more device sensors 518, such as any one or more of an ambient light sensor, a proximity sensor, a touch sensor, an infrared (IR) sensor, accelerometer, gyroscope, and the like. The device 500 can also include one or more power sources 520, such as when the device is implemented as a mobile device. The power sources may include a charging and/or power system, and can be implemented as a flexible strip battery, a rechargeable battery, a charged super-capacitor, and/or any other type of active or passive power source.

The device 500 additionally includes an audio and/or video processing system 522 that generates audio data for an audio system 524 and/or generates display data for a display system 526. In accordance with some embodiments, the audio/video processing system 522 is configured to receive call audio data from the communication system 106 and communicate the call audio data to the audio system 524 for playback at the device 500. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In implementations, the audio system and/or the display system are integrated components of the example device. Alternatively, the audio system and/or the display system are external, peripheral components to the example device.

Although the embodiments described above have been described in language specific to features or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described, and it is to be appreciated that each described embodiment can be implemented independently or in connection with one or more other described embodiments. Additional aspects of the techniques, features, and/or methods discussed herein relate to one or more of the following:

A method, comprising: establishing, using a communication system of a near end device, a communication link between the near end device and a far end device; receiving, from a transceiver of the communication system or a sensor of the near end device, data regarding at least one constraint of the near end device; monitoring, by the near end device while the near end device is in a call over the communication link with the far end device, the data regarding the at least one constraint of the near end device; automatically detecting, by the near end device while the near end device is in the call, that due to the at least one constraint the near end device is having or is soon to have communication difficulty with the call; and communicating, in response to detecting that the near end device is having or is soon to have communication difficulty with the call due to the at least one constraint, an audible or visual feedback to the far end device indicating that the near end device is having or is soon to have communication difficulty with the call.

Alternatively or in addition to the above described method, any one or combination of the following. The monitoring comprising monitoring energy availability at the near end device and the automatically detecting comprising automatically detecting that the near end device is having or is soon to have communication difficulty with the call in response to the energy availability satisfying an energy availability threshold value. The energy availability comprising an amount of charge or energy that remains in a battery of the near end device. The energy availability comprising a charge level of a battery of the near end device. The energy availability comprising an estimated remaining call duration based on an amount of charge or energy that remains in a battery of the near end device. The monitoring comprising monitoring signal conditions over the communication link and the automatically detecting comprising automatically detecting that the near end device is having or is soon to have communication difficulty with the call in response to the signal conditions satisfying a signal conditions threshold value. The signal conditions comprising a radio frequency signal strength and quality. The signal conditions comprising a packet error rate for data packets including call data for the call. The monitoring comprising monitoring environmental noise at the near end device and the automatically detecting comprising automatically detecting when a user of the near end device is unlikely to hear the call audio received at the near end device. The automatically detecting when a user of the near end device is unlikely to hear the call audio received at the computing device comprising automatically detecting when a user of the near end device is unlikely to hear the call audio received at the computing device in response to an environmental noise level satisfying an environmental noise threshold level. The monitoring comprising monitoring a latency between sequential data packets in a series of multiple data packets received at the near end device and the automatically detecting comprising automatically detecting the near end device is having or is soon to have communication difficulty in response to determining that the latency between a set of two sequential data packets in the series of multiple data packets satisfies a data packet latency threshold. The monitoring comprises: monitoring energy availability at the near end device, monitoring signal conditions over the communication link, monitoring environmental noise at the near end device, and monitoring a latency between sequential data packets in a series of multiple data packets received at the near end device; and the automatically detecting comprises automatically detecting that the near end device is having or is soon to have communication difficulty with the call in response to at least one of: the energy availability satisfying an energy availability threshold value, the signal conditions satisfying a signal conditions threshold value, when a user of the near end device is unlikely to hear the call audio received at the computing device, or determining that the latency between a set of two sequential data packets in the series of multiple data packets satisfies a data packet latency threshold. The call comprising a voice call or a video call. The communicating the audible or visual feedback comprising injecting into the call an audio notification that the near end device is having or is soon to have communication difficulty with the call. The communicating the audible or visual feedback comprising communicating the audible or visual feedback via an additional communication link. The method further comprising: identifying a portion of the call audio that a user of the near end device is unlikely to hear; transcribing the portion of the call audio; and the communicating comprising communicating, as the visual feedback, a transcription of the portion of the call audio. The establishing comprising establishing at least one communication link between the near end device and multiple far end devices, the comprising monitoring the data regarding the at least one constraint while the near end device is in the call over the at least one communication link with the multiple far end devices, and the communicating comprising communicating, in response to detecting that the near end device is having or is soon to have communication difficulty with the call due to the at least one constraint, the audible or visual feedback to each of the multiple far end devices. The method further comprising: receiving, from the far end device, an additional audible or visible feedback indicating that the far end device is having or is soon to have communication difficulty with the call, the additional audible or visible feedback having been generated by the far end device based on monitoring data regarding at least one constraint of the far end device; and playing back or displaying the additional audible or visible feedback. The method further comprising: subsequently automatically detecting, by the near end device while the near end device is in the call, that due to the at least one constraint the near end device is no longer having or is no longer soon to have communication difficulty with the call; and communicating, in response to detecting that the near end device is no longer having or is no longer soon to have communication difficulty with the call due to the at least one constraint, an additional audible or visual feedback to the far end device indicating that the near end device is no longer having or is no longer soon to have communication difficulty with the call.

A computing device comprising: a communication system including a transceiver; one or more sensors; one or more processors; and one or more computer readable storage media storing computer-readable instructions which, when executed, perform operations including: receiving, from the transceiver or the one or more sensors, data regarding at least one constraint of the computing device; monitoring, while the computing device is in a call over a communication link between the computing device and a remote device, the data regarding the at least one constraint of the computing device; automatically detecting, while the computing device is in the call, that the data indicates the computing device is having or is soon to have communication difficulty with the call; and communicating, in response to detecting that the computing device is having or is soon to have communication difficulty with the call, an audible or visual feedback to the remote device indicating that the computing device is having or is soon to have communication difficulty with the call.

Alternatively or in addition to the above described computing device, any one or combination of the following. The monitoring comprising monitoring energy availability at the near end device and the automatically detecting comprising automatically detecting that the near end device is having or is soon to have communication difficulty with the call in response to the energy availability satisfying an energy availability threshold value. The monitoring comprising monitoring signal conditions over the communication link and the automatically detecting comprising automatically detecting that the near end device is having or is soon to have communication difficulty with the call in response to the signal conditions satisfying a signal conditions threshold value. The monitoring comprising monitoring environmental noise at the near end device and the automatically detecting comprising automatically detecting when a user of the near end device is unlikely to hear the call audio received at the computing device. The monitoring comprising monitoring a latency between sequential data packets in a series of multiple data packets received at the near end device and the automatically detecting comprising automatically detecting the near end device is having or is soon to have communication difficulty in response to determining that the latency between a set of two sequential data packets in the series of multiple data packets satisfies a data packet latency threshold.

A system in a near end device, the system comprising: a constraint monitoring module, implemented at least in part in hardware, to monitor, while the near end device is in a call over a communication link with a far end device, data regarding at least one constraint of the near end device; a communication difficulty detection module, implemented at least in part in hardware, to automatically detect, while the near end device is in the call, that due to the at least one constraint the near end device is having or is soon to have communication difficulty with the call; and a feedback communication module, implemented at least in part in hardware, to communicate, in response to detecting that the near end device is having or is soon to have communication difficulty with the call, an audible or visual feedback to the far end device indicating that the near end device is having or is soon to have communication difficulty with the call.

Alternatively or in addition to the above described system, any one or combination of the following. Wherein to monitor the data is to monitor energy availability at the near end device, and to automatically detect is to automatically detect that the near end device is having or is soon to have communication difficulty with the call in response to the energy availability satisfying an energy availability threshold value. Wherein to monitor the data is to monitor signal conditions over the communication link, and to automatically detect is to automatically detect that the near end device is having or is soon to have communication difficulty with the call in response to the signal conditions satisfying a signal conditions threshold value. Wherein to monitor the data is to monitor environmental noise at the near end device, and to automatically detect is to automatically detect when a user of the near end device is unlikely to hear the call audio received at the computing device. Wherein to monitor the data is to monitor a latency between sequential data packets in a series of multiple data packets received at the near end device, and to automatically detect is to automatically detect the near end device is having or is soon to have communication difficulty in response to determining that the latency between a set of two sequential data packets in the series of multiple data packets satisfies a data packet latency threshold.

What is claimed is:

1. A method comprising:
    establishing, using a communication system of a near end device, a communication link between the near end device and a far end device;
    receiving, from a transceiver of the communication system or a sensor of the near end device, data regarding at least one constraint of the near end device;
    monitoring, by the near end device while the near end device is in a call over the communication link with the far end device, the data regarding the at least one constraint of the near end device, the call comprising a voice call or a combination of voice and video call, the monitoring including distinguishing environmental noise at the near end device from speech that is communicated by a user of the near end device, the environmental noise corresponding to noise at the near end device excluding the speech that is communicated by the user of the near end device;
    automatically detecting, by the near end device while the near end device is in the call, that the near end device is having or is soon to have communication difficulty with the call based on a determination that the environmental noise detected at the near end device is greater than or within a threshold noise level of call audio of the call transmitted to the near end device from the far end device; and
    communicating, in response to detecting that the near end device is having or is soon to have communication difficulty with the call due to the at least one constraint, an audible feedback to the far end device by injecting into the call an audio notification indicating that the near end device is having or is soon to have communication difficulty with the call, the audible feedback being played back while the call is occurring for all parties to the call to hear, including at least the user of the near end device and an additional user of the far end device.

2. The method as recited in claim 1, the monitoring comprising monitoring energy availability at the near end device and the automatically detecting comprising automatically detecting that the near end device is having or is soon to have communication difficulty with the call in response to the energy availability satisfying an energy availability threshold value.

3. The method as recited in claim 2, the energy availability comprising an amount of charge or energy that remains in a battery of the near end device.

4. The method as recited in claim 2, the energy availability comprising a charge level of a battery of the near end device.

5. The method as recited in claim 2, the energy availability comprising an estimated remaining call duration based on an amount of charge or energy that remains in a battery of the near end device and an energy consumption rate for the near end device during the call.

6. The method as recited in claim 1, the monitoring comprising monitoring signal conditions over the communication link and the automatically detecting comprising automatically detecting that the near end device is having or is soon to have communication difficulty with the call in response to the signal conditions satisfying a signal conditions threshold value.

7. The method as recited in claim 6, the signal conditions comprising a radio frequency signal strength and quality.

8. The method as recited in claim 6, the signal conditions comprising a packet error rate for data packets including call data for the call.

9. The method as recited in claim 1, the automatically detecting comprising automatically detecting when the user of the near end device is unlikely to hear the call audio of the call received at the near end device.

10. The method as recited in claim 1, the monitoring comprising monitoring a latency between sequential data packets in a series of multiple data packets received at the near end device and the automatically detecting comprising automatically detecting the near end device is having or is soon to have communication difficulty in response to determining that the latency between a set of two sequential data packets in the series of multiple data packets satisfies a data packet latency threshold.

11. The method as recited in claim 1, wherein:
the monitoring comprises:
monitoring energy availability at the near end device,
monitoring signal conditions over the communication link, and
monitoring a latency between sequential data packets in a series of multiple data packets received at the near end device; and
the automatically detecting comprises automatically detecting that the near end device is having or is soon to have communication difficulty with the call in response to at least one of:
the energy availability satisfying an energy availability threshold value,
the signal conditions satisfying a signal conditions threshold value, or
determining that the latency between a set of two sequential data packets in the series of multiple data packets satisfies a data packet latency threshold.

12. The method as recited in claim 1, the establishing comprising establishing at least one communication link between the near end device and multiple far end devices, the monitoring comprising monitoring the data regarding the at least one constraint while the near end device is in the call over the at least one communication link with the multiple far end devices, and the communicating comprising communicating, in response to detecting that the near end device is having or is soon to have communication difficulty with the call due to the at least one constraint, the audible feedback to each of the multiple far end devices.

13. The method as recited in claim 1, further comprising: receiving, from the far end device, an additional audible or visible feedback indicating that the far end device is having or is soon to have communication difficulty with the call, the additional audible or visible feedback having been generated by the far end device based on monitoring data regarding at least one constraint of the far end device; and playing back or displaying the additional audible or visible feedback.

14. The method as recited in claim 1, further comprising: subsequently automatically detecting, by the near end device while the near end device is in the call, that due to the at least one constraint the near end device is no longer having or is no longer soon to have communication difficulty with the call; and communicating, in response to detecting that the near end device is no longer having or is no longer soon to have communication difficulty with the call due to the at least one constraint, an additional audible feedback to the far end device indicating that the near end device is no longer having or is no longer soon to have communication difficulty with the call, the additional audible feedback being played back while the call is occurring for all parties to the call to hear, including at least the user of the near end device and the additional user of the far end device.

15. A computing device comprising:
a communication system including a transceiver;
one or more sensors;
one or more processors; and
one or more computer readable storage media storing computer-readable instructions which, when executed, perform operations including:
receiving, from the transceiver or the one or more sensors, data regarding at least one constraint of the computing device;
monitoring, while the computing device is in a call over a communication link between the computing device and a remote device, the data regarding the at least one constraint of the computing device, the call comprising a voice call or a combination of voice and video call, the monitoring including distinguishing environmental noise at the computing device from speech that is communicated by a user of the computing device, the environmental noise corresponding to noise at the computing device excluding the speech that is communicated by the user of the computing device;
automatically detecting, while the computing device is in the call, that the computing device is having or is soon to have communication difficulty with the call based on a determination that the environmental noise detected at the computing device is greater than or within a threshold noise level of call audio of the call transmitted to the computing device from the remote device;
identifying a portion of the call audio of the call that the user of the computing device is unlikely to hear;
transcribing the portion of the call audio; and
communicating, in response to detecting that the computing device is having or is soon to have communication difficulty with the call, a transcription of the portion of the call audio to the remote device, the transcription indicating to a user of the remote device that the computing device is having or is soon to have communication difficulty with the call and identifying to the user of the remote device the portion of the call audio that the user of the computing device is unlikely to hear.

16. The computing device as recited in claim 15, the operations further including communicating audible feedback to the remote device by injecting into the call an audio notification that the computing device is having or is soon to have communication difficulty with the call.

17. A system in a near end device, the system comprising:
- a constraint monitoring module, implemented at least in part in hardware, to monitor, while the near end device is in a call over a communication link with a far end device, data regarding at least one constraint of the near end device, the call comprising a voice call or a video call;
- a communication difficulty detection module, implemented at least in part in hardware, to automatically detect, while the near end device is in the call, that due to the at least one constraint the near end device is having or is soon to have communication difficulty with the call; and
- a feedback communication module, implemented at least in part in hardware, to communicate, in response to detecting that the near end device is having or is soon to have communication difficulty with the call, feedback to the far end device indicating that the near end device is having or is soon to have communication difficulty with the call, the feedback changing over time during the call while the near end device is having or is soon to have communication difficulty with the call from both audible feedback and visual feedback to visual feedback only.

18. The system as recited in claim 17, wherein to communicate the audible feedback to the far end device is to inject into the call an audio notification that the near end device is having or is soon to have communication difficulty with the call.

19. The system as recited in claim 17, wherein to communicate the audible feedback to the far end device is to communicate the audible feedback to the far end device via an additional communication link.

20. The system as recited in claim 17, wherein the feedback communication module is further to:
- identify a portion of call audio of the call that a user of the near end device is unlikely to hear;
- transcribe the portion of the call audio;
- communicate, as the visual feedback, a transcription of the portion of the call audio to the far end device; and
- display the transcription of the portion of the call audio at the near end device.

* * * * *